United States Patent
Konno et al.

(10) Patent No.: US 11,361,748 B2
(45) Date of Patent: Jun. 14, 2022

(54) SPEAKER SYSTEM AND NOISE CONTROLLING DEVICE

(71) Applicant: Panasonic Intellectual Property Management Co., Ltd., Osaka (JP)

(72) Inventors: Fumiyasu Konno, Osaka (JP); Shigeru Nishida, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/100,404

(22) Filed: Nov. 20, 2020

(65) Prior Publication Data

US 2021/0074258 A1   Mar. 11, 2021

Related U.S. Application Data

(63) Continuation of application No. PCT/JP2019/018254, filed on May 7, 2019.

(30) Foreign Application Priority Data

May 31, 2018   (JP) .............................. JP2018-104257

(51) Int. Cl.
*B60N 2/879* (2018.01)
*G10K 11/178* (2006.01)
(Continued)

(52) U.S. Cl.
CPC ........ *G10K 11/17881* (2018.01); *A47C 7/727* (2018.08); *A47C 31/006* (2013.01);
(Continued)

(58) Field of Classification Search
CPC .. G10K 2210/3221; H04R 5/023; H04R 1/02; H04R 1/025; H04R 2499/13
See application file for complete search history.

(56) References Cited

U.S. PATENT DOCUMENTS

| | | | |
|---|---|---|---|
| 5,387,026 A | * | 2/1995 | Matsuhashi ............ B60N 2/879 297/217.4 |
| 2007/0086612 A1 | * | 4/2007 | Nishibori ............. A47C 21/003 381/333 |

(Continued)

FOREIGN PATENT DOCUMENTS

| | | |
|---|---|---|
| JP | 63-042259 | 3/1988 |
| JP | 01-202099 | 8/1989 |

(Continued)

OTHER PUBLICATIONS

Official Communication issued in International Patent Application No. PCT/JP2019/018254, dated Jun. 25, 2019, along with an English translation thereof.

(Continued)

*Primary Examiner* — Kile O Blair
(74) *Attorney, Agent, or Firm* — Greenblum & Bernstein, P.L.C.

(57) ABSTRACT

A speaker system includes a cushion body with which a person comes into contact when sitting therein, and a speaker, a front of which is covered by the cushion body. The cushion body includes: a three-dimensional mesh-like elastic part that is formed by a three-dimensionally entangled fiber and bears a load of the person; and a cover member that covers surroundings of the three-dimensional mesh-like elastic part. The cover member includes a first cover member that covers the part of the surroundings of the three-dimensional mesh-like elastic part located at the front of the speaker, and a second cover member that is a remainder of the cover member excluding the first cover member. The first cover member has a higher acoustic transmissivity than the second cover member.

19 Claims, 12 Drawing Sheets

(51) Int. Cl.
  *B60N 2/90*    (2018.01)
  *A47C 7/72*    (2006.01)
  *A47C 31/00*   (2006.01)
  *B60R 11/02*   (2006.01)
  *H04R 1/02*    (2006.01)
  *B60R 11/00*   (2006.01)

(52) U.S. Cl.
  CPC .............. *B60N 2/879* (2018.02); *B60N 2/90* (2018.02); *B60R 11/0217* (2013.01); *H04R 1/025* (2013.01); *B60R 2011/0012* (2013.01); *G10K 11/17854* (2018.01); *G10K 2210/3026* (2013.01); *G10K 2210/3027* (2013.01); *G10K 2210/3028* (2013.01); *G10K 2210/3221* (2013.01)

(56) References Cited

U.S. PATENT DOCUMENTS

| | | |
|---|---|---|
| 2010/0111317 A1 | 5/2010 | Asao et al. |
| 2016/0039320 A1 | 2/2016 | Subat et al. |
| 2016/0255430 A1 | 9/2016 | Fujita et al. |
| 2017/0072869 A1 | 3/2017 | Ito et al. |
| 2018/0281965 A1* | 10/2018 | Pons ............... B60N 2/879 |

FOREIGN PATENT DOCUMENTS

| | | |
|---|---|---|
| JP | 2005-143522 | 6/2005 |
| JP | 2009-247388 | 10/2009 |
| JP | 2009-274687 | 11/2009 |
| JP | 2010-228612 | 10/2010 |
| JP | 2013-076201 | 4/2013 |
| JP | 2015-100026 | 5/2015 |
| JP | 2015-111796 | 6/2015 |
| JP | 2016-43828 A | 4/2016 |
| JP | 2017-525456 | 9/2017 |
| WO | 2009/078147 A1 | 6/2009 |
| WO | 2016/022238 | 2/2016 |

OTHER PUBLICATIONS

Office Action issued in Japanese Counterpart Patent Appl. No. 2018-104257, dated Sep. 14, 2021.

* cited by examiner

SPEAKER SYSTEM AND NOISE CONTROLLING DEVICE

CROSS REFERENCE TO RELATED APPLICATIONS

This is a continuation application of PCT International Application No. PCT/JP2019/018254 filed on May 7, 2019, designating the United States of America, which is based on and claims priority of Japanese Patent Application No. 2018-104257 filed on May 31, 2018.

BACKGROUND

1. Technical Field

The present disclosure relates to a speaker system and a noise controlling device.

2. Description of the Related Art

Japanese Unexamined Patent Application Publication (Translation of PCT Application) No. 2017-525456 discloses a headrest with speakers.

SUMMARY

However, the headrest with speakers in Japanese Unexamined Patent Application Publication (Translation of PCT Application) No. 2017-525456 can be improved upon.

In view of this, the present disclosure provides a speaker system, and so on, capable of improving upon the above related art.

A speaker system according to an aspect of the present disclosure includes: a cushion body with which a person comes into contact when the person is sitting in or lying on the cushion body; a speaker, a front of which is covered by the cushion body; and a baffle plate to which the speaker is fixed, wherein the cushion body includes: a three-dimensional mesh-like elastic part that bears a load of the person, the three-dimensional mesh-like elastic part being formed by a fiber three-dimensionally entangled; and a cover member that covers an exterior of the three-dimensional mesh-like elastic part, the fiber of the three-dimensional mesh-like elastic part comprises a polyester-based or polyethylene-based material, the cover member includes a first cover member that covers a part of the exterior of the three-dimensional mesh-like elastic part located at the front of the speaker and a second cover member that is a remainder of the cover member excluding the first cover member, and the first cover member has a higher acoustic transmissivity than the second cover member.

A speaker system according to an aspect of the present disclosure includes: a cushion body with which a person comes into contact when the person is sitting in or lying on the cushion body; a speaker that has a front part exposed to an outside space and a remaining part excluding the front part embedded in the cushion body; and a baffle plate to which the speaker is fixed, wherein the cushion body includes: a three-dimensional mesh-like elastic part that bears a load of the person, the three-dimensional mesh-like elastic part being formed by a fiber three-dimensionally entangled; and a cover member that has airtightness and, together with the baffle plate, covers a surrounding of the three-dimensional mesh-like elastic part, and the fiber of the three-dimensional mesh-like elastic part comprises a polyester-based or polyethylene-based material.

A noise controlling device according to an aspect of the present disclosure includes either of the above-described speaker systems; and a control circuit that outputs a control signal for reducing a noise in a vicinity of a position of a head of the person to the speaker.

A speaker system, and so on, according to one aspect of the present disclosure can improve upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
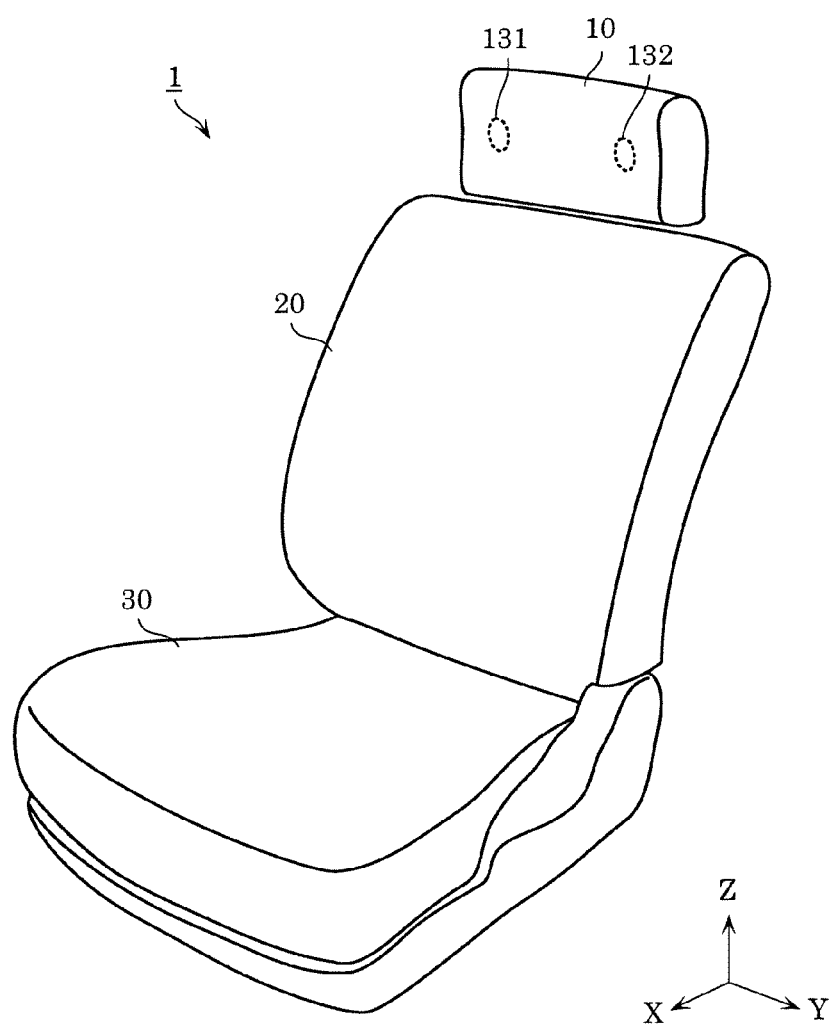
FIG. 1 is a diagram showing an appearance of a seat with a speaker system according to Embodiment 1.

According to the technique of Japanese Unexamined Patent Application Publication (Translation of PCT Application) No. 2017-525456, the net member protecting the speaker is exposed, so that a person may feel uncomfortable when the person is leaning on the headrest. If the speaker is arranged in the cushion of the headrest in order to reduce the uncomfortable feeling given to the person, there is a problem that the sound from the speaker is absorbed by the cushion and cannot be effectively emitted to the outside of the headrest.

In view of such circumstances, an object of the present disclosure is to provide a speaker system having a cushion body with which a person comes into contact that can reduce the uncomfortable feeling given to a person when the person comes into contact with the speaker system and can effectively emit sound to the outside.

A speaker system according to an aspect of the present disclosure includes: a cushion body with which a person comes into contact when the person is sitting in or lying on the cushion body; a speaker, a front of which is covered by the cushion body; and a baffle plate to which the speaker is fixed. The cushion body includes: a three-dimensional mesh-like elastic part that bears a load of the person and is formed by a fiber three-dimensionally entangled; and a cover member that covers an exterior of the three-dimensional mesh-like elastic part. The fiber of the three-dimensional mesh-like elastic part comprises a polyester-based or polyethylene-based material. The cover member includes a first cover member that covers a part of the exterior of the three-dimensional mesh-like elastic part located at the front of the speaker and a second cover member that is a remainder of the cover member excluding the first cover member. The first cover member has a higher acoustic transmissivity than the second cover member.

As described above, the speaker is covered with the cushion body, which is a cushion member, at the front thereof. Therefore, even if a person comes into contact with the speaker system, the person comes into contact with the cushion body, and the uncomfortable feeling experienced by the person coming into contact with the speaker system can be reduced. In addition, the cushion body includes the three-dimensional mesh-like elastic part as a cushion member. Therefore, even if the cushion body is arranged in front of the speaker, the speaker can effectively emit a sound to the outside.

Furthermore, the three-dimensional mesh-like elastic part may be formed by an elastic body portion and an air portion, and a volume of the air portion may be 90% or more of a volume of the entire three-dimensional mesh-like elastic part.

Therefore, the cushion body can effectively serve both a function as a cushion member and a function of transmitting the sound from the speaker.

Furthermore, the acoustic transmissivity of the three-dimensional mesh-like elastic part may be 98% or higher.

Therefore, the cushion body can efficiently transmit the sound from the speaker.

Furthermore, the fiber of the three-dimensional mesh-like elastic part may have a surface without irregularities.

Furthermore, the second cover member may have airtightness, and a sound absorbing material may be arranged between the second cover member and the speaker.

Therefore, a stationary wave can be effectively reduced.

Furthermore, the speaker system may form a headrest of a seat, the cushion body may include a first cushion portion that forms a front part of the headrest, and the speaker may be oriented to emit sound toward a front of the headrest.

Therefore, the speaker system can reduce the uncomfortable feeling experienced by the person coming into contact with the headrest and can effectively and efficiently emit a sound toward the front of the headrest. In addition, since the speaker can be arranged at a location close to the head of the person, the person can hear a sufficiently loud sound even if the output of the speaker is lowered. Therefore, the power consumption of the speaker system can be reduced.

Furthermore, the cushion body may further include a second cushion portion that forms a rear part of the headrest. The first cushion portion may include a first three-dimensional mesh-like elastic part that is a part of the three-dimensional mesh-like elastic part and covers the front of the speaker, and a first cover portion that is a part of the cover member and covers the first three-dimensional mesh-like elastic part. The second cushion portion may include a second three-dimensional mesh-like elastic part that is a part of the three-dimensional mesh-like elastic part and covers a rear of the speaker, and a second cover portion that is a part of the cover member and, together with the baffle part, covers the second three-dimensional mesh-like elastic part.

With this configuration, the speaker is covered with the second three-dimensional mesh-like elastic part at the rear thereof, and the second three-dimensional mesh-like elastic part is covered by the baffle plate and the second cover portion. The second cover portion, which is arranged at the rear of the speaker, is formed by the second cover member. Therefore, a closed space defined by the baffle plate and the second cover member is formed at the rear of the speaker, and the closed space can serve as an enclosure. Since the space in the second cushion portion serving as a cushion member can also serve as an enclosure, the volume of the space in the headrest can be efficiently used. Therefore, the stiffness of a gas in the closed space in the second cushion portion can be reduced. Therefore, canceling of low-frequency sounds can be reduced, and a sound having excellent sound pressure frequency characteristics can be emitted forward.

Furthermore, the cushion body may further include a second cushion portion that forms a rear part of the headrest. The first cushion portion may include a first three-dimensional mesh-like elastic part that is a part of the three-dimensional mesh-like elastic part and covers the front of the speaker, and a first cover portion that is a part of the cover member and covers the first three-dimensional mesh-like elastic part. The second cushion portion may include a cushion member that covers the rear of the speaker with a space interposed between the cushion member and the speaker and a second cover portion that is a part of the cover member and covers the cushion member.

Furthermore, the speaker system may form a headrest or a backrest of a seat, the cushion body may include a first cushion portion that forms a rear part of the headrest or the backrest, and the speaker may be oriented to emit sound rearward from the backrest or the headrest.

Therefore, the uncomfortable feeling experienced by the person coming into contact with the backrest or the headrest can be reduced, and a sound can be effectively and efficiently emitted rearward from the backrest or the headrest.

Furthermore, the cushion body may further include a second cushion portion that forms a front part of the headrest or the backrest. The first cushion portion may include a first three-dimensional mesh-like elastic part that is a part of the three-dimensional mesh-like elastic part and covers the front of the speaker, and a first cover portion that is a part of the cover member and covers the first three-dimensional mesh-like elastic part. The second cushion portion may include a second three-dimensional mesh-like elastic part that is a part of the three-dimensional mesh-like elastic part and covers the rear of the speaker, and a second cover portion that is a part of the cover member and, together with the baffle plate, covers the second three-dimensional mesh-like elastic part.

With this configuration, the speaker is covered with the second three-dimensional mesh-like elastic part at the rear thereof, and the second three-dimensional mesh-like elastic part is covered by the baffle plate and the second cover portion. The second cover portion, which is arranged at the rear of the speaker, is formed by the second cover member. Therefore, a closed space defined by the baffle plate and the second cover member is formed at the rear of the speaker, and the closed space can serve as an enclosure. Since the space in the second cushion portion serving as a cushion member can also serve as an enclosure, the volume of the space in the headrest or the backrest can be efficiently used. Therefore, the stiffness of a gas in the closed space in the second cushion portion can be reduced. Therefore, canceling of low-frequency sounds can be reduced, and a sound having excellent sound pressure frequency characteristics can be emitted backward.

A speaker system according to an aspect of the present disclosure includes: a cushion body with which a person comes into contact when the person is sitting in or lying on the cushion body; a speaker that has a front part exposed to an outside space and a remaining part excluding the front part embedded in the cushion body; and a baffle plate to which the speaker is fixed. The cushion body includes: a three-dimensional mesh-like elastic part that bears a load of the person and is formed by a fiber three-dimensionally entangled; and a cover member that has airtightness and, together with the baffle plate, covers a surrounding of the three-dimensional mesh-like elastic part. The fiber of the three-dimensional mesh-like elastic part comprises a polyester-based or polyethylene-based material.

With this configuration, the speaker is covered with the three-dimensional mesh-like elastic part at the rear thereof, and the three-dimensional mesh-like elastic part is covered by the baffle plate and the cover member. Therefore, even if a person comes into contact with the speaker system, the person comes into contact with the cushion body of the speaker system, and the uncomfortable feeling experienced by the person coming into contact with the speaker system can be reduced.

In addition, the cover member is made of a material having airtightness. Therefore, a closed space defined by the baffle plate and the cover member is formed at the rear of the speaker, and the closed space can serve as an enclosure. Since the space in the cushion body serving as a cushion member can also serve as an enclosure, the volume of the space within the seat face can be efficiently used. Therefore, the stiffness of a gas in the closed space defined by the cushion body and the baffle plate can be reduced. Therefore, canceling of low-frequency sounds can be effectively reduced, and a sound having excellent sound pressure frequency characteristics can be emitted rearward.

Furthermore, the three-dimensional mesh-like elastic part may be formed by an elastic body portion and an air portion, and a volume of the air portion may be 90% or more of a volume of the entire three-dimensional mesh-like elastic part.

Therefore, both a function as a cushion member and a function of transmitting the sound from the speaker can be effectively served.

Furthermore, the cushion body may form a seat face of a seat, the speaker may be oriented to emit sound downward from the seat face, and the cover member may form a surface of the seat face.

Therefore, the uncomfortable feeling experienced by the person coming into contact with the seat face can be reduced, and a sound can be effectively and efficiently emitted downward from the seat face. Furthermore, if the speaker is a sub-woofer, for example, vibration from the sub-woofer can be exerted to the person, and the person can physically feel a low-frequency sound from the sub-woofer. Therefore, the speaker system can reproduce a variety of rich sounds.

Furthermore, a signal of a low-frequency sound may input to the speaker.

Furthermore, a signal that controls vibration may be input to the speaker.

A noise controlling device according to an aspect of the present disclosure includes either of the above-described speaker systems; and a control circuit that outputs a control signal for reducing a noise in a vicinity of a position of the head of the person to the speaker.

Therefore, the uncomfortable feeling experienced by the person coming into contact with the speaker system can be reduced, and the noise in the vicinity of the head of the person can be effectively reduced.

Furthermore, the noise controlling device may further include a sound collector that collects a noise, the sound collector being arranged in the cushion body. The control circuit may repeatedly obtain an output signal of the sound collector, and may repeatedly generate the control signal so as to minimize the obtained output signal.

With this configuration, since a control coefficient is adjusted so as to reduce an error signal obtained from the sound collector, the noise in the vicinity of the head of the person can be effectively reduced.

Hereinafter, a speaker system and a noise controlling device according to an aspect of the present disclosure will be described in detail with reference to the drawings.

It should be noted that each of the subsequently described embodiments indicate a specific example of the present disclosure. The numerical values, shapes, materials, structural components, the arrangement and connection of the structural components, steps, and the processing order of the steps, etc., shown in the subsequent embodiments are mere examples, and thus are not intended to limit the present disclosure. Furthermore, among the structural components described in the subsequent embodiments, structural components not recited in any one of the independent claims which indicate the broadest concepts are described as optional structural components.

Embodiment 1

A configuration of a speaker system according to Embodiment 1 will be described.

1-1. Configuration

FIG. 1 is a diagram showing an appearance of a seat with a speaker system according to Embodiment 1.

As shown in FIG. 1, seat 1 includes speaker system 10 forming a headrest, backrest 20, and seat face 30. Speaker system 10 includes two speakers 131 and 132. Seat 1 is a seat arranged in a vehicle, such as an automobile, an airplane, or a ship. Seat 1 is not limited to a seat arranged in a vehicle but may be a seat arranged in a movie theater, a theater, or a conference room, for example. Seat 1 may be a chair with a cushion, a legless chair, a sofa, or a massage chair, for example. The number of the speakers of speaker system 10 is not limited to two but can be any number equal to or greater than 1.

The headrest is a part that supports the head of a person when the person is sitting in seat 1. Backrest 20 is a part that supports the back of the person when the person is sitting in seat 1. Seat face 30 is a part that supports the thighs of the person when the person is sitting in seat 1.

In the following description, it is supposed that the front-rear direction of seat 1 is an X-axis direction, the left-right direction of seat 1 is a Y-axis direction, and the up-down direction of seat 1 is a Z-axis direction. In the following description, furthermore, it is supposed that the front side in the front-rear direction is a positive side in the X-axis direction, the rear side in the front-rear direction is a negative side in the X-axis direction, the left side in the left-right direction is a positive side in the Y-axis direction, the right side in the left-right direction is a negative side in the Y-axis direction, the up side in the up-down direction is a positive side in the Z-axis direction, and the down side in the up-down direction is a negative side in the Z-axis direction.

In the following description, the directions described above are defined on the supposition that backrest 20 is not reclined, that is, not inclined to the rear, but is raised up in the Z-axis direction.

Furthermore, in the present disclosure, the "front side" of a speaker refers to the side of the speaker on which a diaphragm of the speaker is arranged, and the "rear side" of a speaker refers to the side of the speaker on which a magnetic circuit of the speaker is arranged. That is, the "forward direction" of a speaker refers to the direction from the magnetic circuit to the diaphragm of the speaker, and the "rearward direction" of a speaker refers to the direction from the diaphragm to the magnetic circuit of the speaker.

Next, a specific configuration of speaker system 10 will be described.

Figure 2:
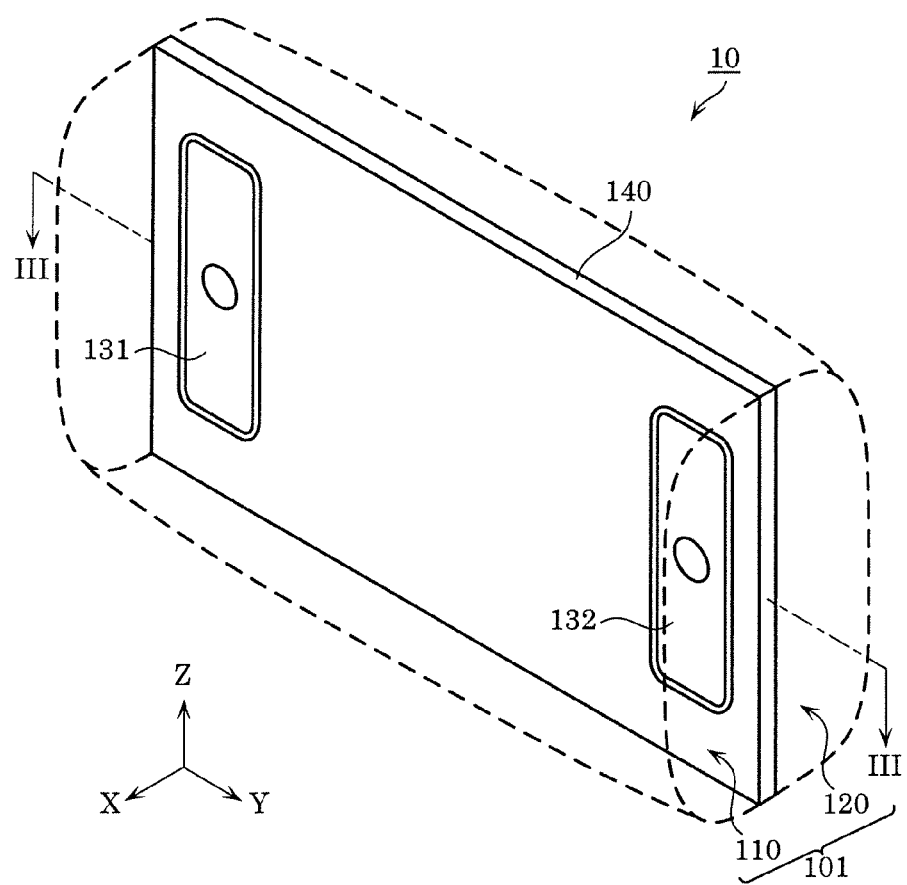
FIG. 2 is a perspective view showing a configuration of the speaker system according to Embodiment 1.
Figure 3:
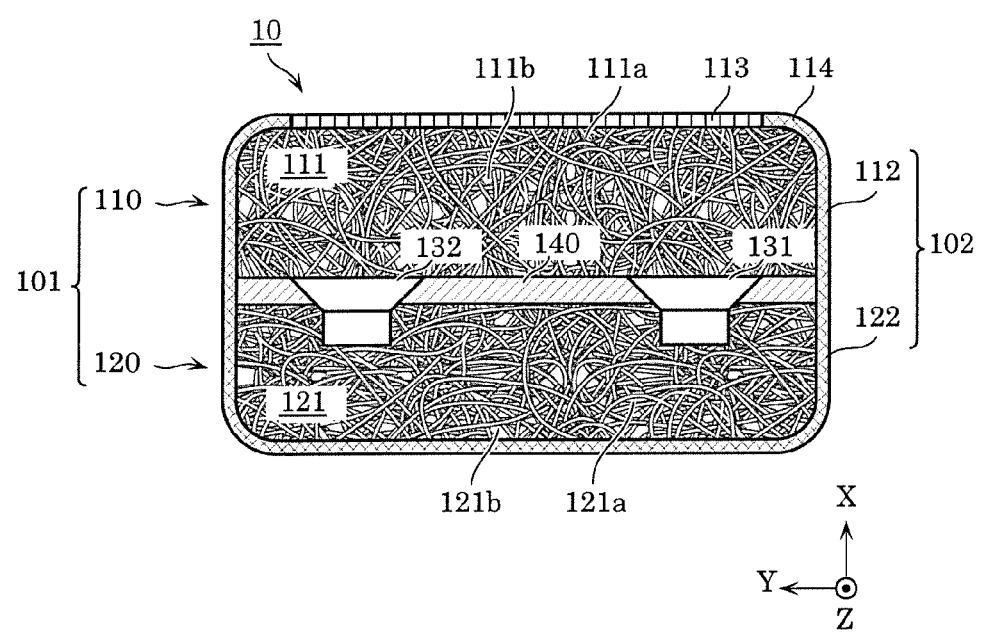
FIG. 3 is a cross-sectional view of the speaker system taken along the line III-III in FIG. 2.

FIG. 2 is a perspective view showing a configuration of the speaker system according to Embodiment 1. FIG. 3 is a cross-sectional view of the speaker system taken along the line III-III in FIG. 2. Note that, in FIG. 2, a cover member that covers the exterior of speaker system 10 is shown only by a dashed line.

As shown in FIGS. 2 and 3, speaker system 10 includes cushion body 101, and two speakers 131 and 132. Speaker system 10 may further include baffle plate 140.

Cushion body 101 is a member with which a person comes into contact when the person is sitting in the seat. Cushion body 101 includes three-dimensional mesh-like elastic parts 111 and 121 and cover member 102.

Three-dimensional mesh-like elastic parts 111 and 121 are members that bear the load of the person and are made of fibers three-dimensionally entangled. Fibers of three-dimensional mesh-like elastic parts 111 and 121 are continuous linear bodies winding and forming loops. The fibers of three-dimensional mesh-like elastic parts 111 and 121 have a surface without irregularities. Three-dimensional mesh-like elastic parts 111 and 121 include elastic body portions 111a and 121a and air portions 111b and 121b, respectively. The volumes of air portions 111b and 121b are 90% or more of the volumes of three-dimensional mesh-like elastic parts 111 and 121, respectively. In other words, the volumes of elastic body portions 111a and 121a are less than 10% of the volumes of the spaces occupied by three-dimensional mesh-like elastic parts 111 and 121, respectively. The fibers of three-dimensional mesh-like elastic parts 111 and 121 are made of a thermoplastic elastic resin, for example, a polyester-based or polyethylene-based material. More specifically, the fibers of three-dimensional mesh-like elastic parts 111 and 121 are made of a polyester elastomer, a polyamide elastomer, a polyurethane elastomer, or a polyolefin elastomer, for example.

Cover member 102 is a member that covers an exterior of three-dimensional mesh-like elastic parts 111 and 121. In other words, cover member 102 forms a space, the interior of which is filled with three-dimensional mesh-like elastic parts 111 and 121. That is, the space occupied by three-dimensional mesh-like elastic parts 111 and 121 is the same as the space covered by cover member 102.

Two speakers 131 and 132 are covered with cushion body 101 at a front thereof. Two speakers 131 and 132 are arranged in such an orientation that speakers 131 and 132 emit a sound toward the positive side in the X-axis direction of the headrest. Two speakers 131 and 132 are full-range speakers, for example.

Baffle plate 140 is a member having the shape of a rectangular plate that is housed in cushion body 101. Two speakers 131 and 132 are fixed to baffle plate 140. Baffle plate 140 has two openings having a size corresponding to that of two speakers 131 and 132. Two speakers 131 and 132 are fixed to baffle plate 140 in such a manner that front faces of two speakers 131 and 132 are exposed in the two openings. Baffle plate 140 is arranged to divide cushion body 101 in the X-axis direction, and has a size corresponding to the width in the Z-axis direction and the width in the Y-axis direction of cushion body 101. Baffle plate 140 is made of wood, resin, or metal, for example.

Cushion body 101 includes first cushion portion 110 and second cushion portion 120 that are arranged toward the front and rear of the headrest, respectively. First cushion portion 110 forms a part of cushion body 101 toward the positive side in the X-axis direction. That is, first cushion portion 110 is arranged on the positive side in the X-axis direction of baffle plate 140. Second cushion portion 120 is a portion that forms a part of cushion body 101 toward the negative side in the X-axis direction. That is, second cushion portion 120 is arranged on the negative side in the X-axis direction of baffle plate 140.

First cushion portion 110 includes first three-dimensional mesh-like elastic part 111 and first cover portion 112. First three-dimensional mesh-like elastic part 111 is a part of the three-dimensional mesh-like elastic part of cushion body 101 that covers the front of speakers 131 and 132. First cover portion 112 is a portion that covers first three-dimensional mesh-like elastic part 111 in cooperation with baffle plate 140. First cover portion 112 is a portion of cover member 102 that is arranged on the positive side in the X-axis direction of baffle plate 140.

Second cushion portion 120 includes second three-dimensional mesh-like elastic part 121 and second cover portion 122. Second three-dimensional mesh-like elastic part 121 is a part of the three-dimensional mesh-like elastic part of cushion body 101 that excludes first three-dimensional mesh-like elastic part 111 and covers the rear of speakers 131 and 132. Second cover portion 122 is a portion that covers second three-dimensional mesh-like elastic part 121 in cooperation with baffle plate 140. Second cover portion 122 is a portion of cover member 102 that is arranged on the negative side in the X-axis direction of baffle plate 140.

Cover member 102 includes first cover member 113 that covers a part of the surroundings of three-dimensional mesh-like elastic parts 111 and 121 in front of speakers 131 and 132, and second cover member 114 that is the remainder of cover member 102 excluding first cover member 113. In this embodiment, first cover portion 112 is formed by first cover member 113 and second cover member 114. Second cover portion 122 is formed only by second cover member 114. First cover member 113 is made of a material having a higher acoustic transmissivity than second cover member 114. First cover member 113 is made of a material having air permeability, and second cover member 114 may be made of a material having airtightness. Note that, although first cover member 113 is shown as being formed as one part having a size enough to cover speakers 131 and 132 when viewed in the X-axis direction, the present invention is not limited to this implementation, but first cover member 113 may be formed by two parts each having a size enough to cover one of speakers 131 and 132.

As described above, the rear of speakers 131 and 132 is covered by second three-dimensional mesh-like elastic part 121, and second three-dimensional mesh-like elastic part 121 is covered by baffle plate 140 and second cover portion 122. Second cover portion 122 is formed by second cover member 114. Therefore, a closed space defined by baffle plate 140 and second cover member 114 is formed at the rear of speakers 131 and 132, and the closed space can serve as an enclosure. Since the space in second cushion portion 120 serving as a cushion member can also serve as an enclosure, the volume of the space in the headrest can be efficiently used. Therefore, the stiffness of a gas in the closed space in second cushion portion 120 can be reduced. Therefore, canceling of low-frequency sounds can be reduced, and a sound having excellent sound pressure frequency characteristics can be emitted forward.

Second cover member 114 may include a sound absorbing material. Specifically, second cover member 114 may be made of two or more layers of materials including a sound absorbing material arranged on the inner side and a cover material having a sheet-like shape arranged on the outer side. When second cover member 114 is made of two layers of materials, the sound absorbing material is arranged between the cover material and speakers 131 and 132. The sound absorbing material may be glass-wool or felt, for example, or may be a foamed material such as urethane, or sponge. The cover material having a sheet-like shape may be a fabric such as cloth, leather, or synthetic leather, for example. Since second cover member 114 is made of the sound absorbing material, second cover member 114 can effectively reduce a stationary wave.

Note that second cover member 114 may not be made of two or more layers of materials but may be made of one layer of material.

Second cover member 114 may have airtightness.

1-2. Effects and the Like

Speaker system 10 according to this embodiment includes cushion body 101 and speakers 131 and 132. Cushion body 101 is a member with which a person comes into contact when the person is sitting in the seat. Speakers 131 and 132 are covered with cushion body 101 at a front thereof. Cushion body 101 includes three-dimensional mesh-like elastic parts 111 and 121 and cover member 102. Three-dimensional mesh-like elastic parts 111 and 121 are members that bear the load of the person and are made of fibers three-dimensionally entangled. Cover member 102 is a member that covers an exterior of three-dimensional mesh-like elastic parts 111 and 121. Cover member 102 includes first cover member 113 and second cover member 114. First cover member 113 is a member that covers a part of the surroundings of three-dimensional mesh-like elastic parts 111 and 121 in front of speakers 131 and 132. Second cover member 114 is the remainder of cover member 102 excluding first cover member 113. First cover member 113 has a higher acoustic transmissivity than second cover member 114.

As described above, speakers 131 and 132 are covered with cushion body 101 at a front thereof. Therefore, even if a person sitting in the seat comes into contact with speaker system 10, the person comes into contact with cushion body 101, and the uncomfortable feeling experienced by the person coming into contact with speaker system 10 can be reduced. In addition, cushion body 101 includes three-dimensional mesh-like elastic parts 111 and 121 as cushion members. Therefore, speaker system 10 can effectively emit a sound from speakers 131 and 132 to the outside of speaker system 10 even though cushion body 101 is arranged toward the front of speakers 131 and 132.

With speaker system 10 according to this embodiment, the volume of the three-dimensional mesh-like elastic parts 111 and 121 is less than 10% of the volume of cushion body 101. Therefore, three-dimensional mesh-like elastic parts 111 and 121 can effectively serve both a function as a cushion member and a function of transmitting the sound from speakers 131 and 132.

In addition, speaker system 10 according to this embodiment forms a headrest of seat 1. Cushion body 101 includes first cushion portion 110 that forms a front part of the headrest. Speakers 131 and 132 are arranged in such an orientation that speakers 131 and 132 emit a sound toward the front of the headrest.

Therefore, the uncomfortable feeling experienced by the person coming into contact with the headrest can be reduced, and a sound can be effectively and efficiently emitted toward the front of the headrest. In addition, since speakers 131 and 132 can be arranged at locations close to the head of the person, the person can hear a sufficiently loud sound even if the output of speakers 131 and 132 is lowered. Therefore, the power consumption of speaker system 10 can be reduced.

In addition, speaker system 10 forms a headrest, in front of which the head of the person sitting in the seat is located. Therefore, if an adjustment is made so that an optimal sound is emitted toward the front of the headrest, an optimally adjusted sound can be provided to the person, regardless of the position of seat 1. Therefore, even if seat 1 is moved, such as when seat 1 is rotated in the cabin of an automobile, an optimally adjusted sound can be easily provided to the person.

1-3. Variations of Embodiment 1

1-3-1. Variation 1

With speaker system 10 according to Embodiment 1, the rear part of the headrest is formed by second cushion portion 120. However, the present invention is not limited to this implementation.

Figure 4:
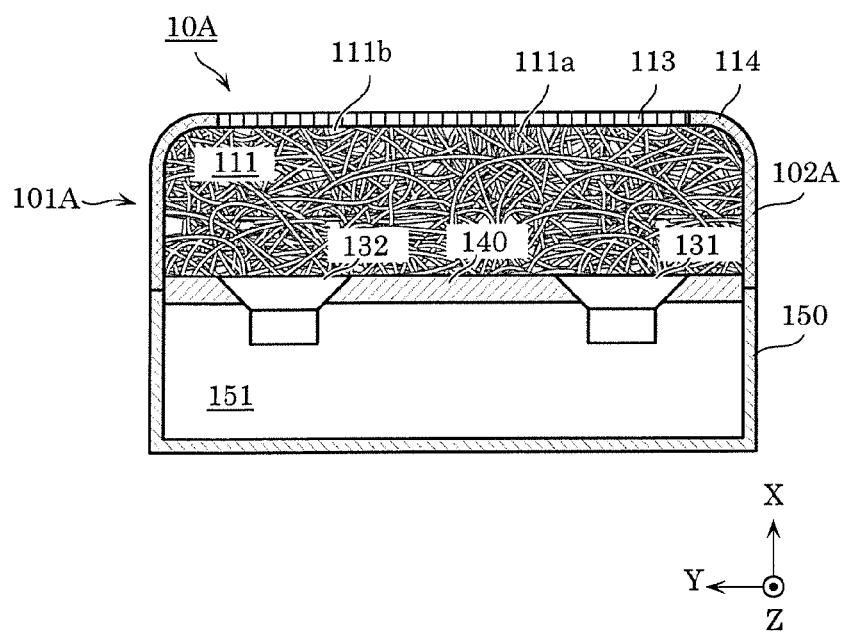
FIG. 4 is a cross-sectional view of a speaker system according to Variation 1 of Embodiment 1 that corresponds to the cross-sectional view taken along the line III-III.

FIG. 4 is a cross-sectional view of a speaker system according to Variation 1 of Embodiment 1 that corresponds to the cross-sectional view taken along the line III-III.

As shown in FIG. 4, speaker system 10A according to Variation 1 of Embodiment 1 includes cushion body 101A, speakers 131 and 132, baffle plate 140, and box body 150.

Cushion body 101A has the same configuration as first cushion portion 110 according to Embodiment 1. That is, cushion body 101A includes three-dimensional mesh-like elastic part 111 and cover member 102A. Speakers 131 and 132 and baffle plate 140 have the same configurations as those in speaker system 10 according to Embodiment 1 and therefore will not be further described.

Box body 150 is a member having a box-like shape that is arranged on the negative side in the X-axis direction of baffle plate 140 and defines space 151 in cooperation with baffle plate 140. Box body 150 is made of wood, resin, or metal, for example. Box body 150, which defines space 151 in cooperation with baffle plate 140, serves as an enclosure as with second cushion portion 120 in Embodiment 1 described above.

1-3-2. Variation 2

With speaker system 10 according to Embodiment 1, first three-dimensional mesh-like elastic part 111 is arranged in the entire internal space of first cushion portion 110 on the front side of the headrest. However, the present invention is not limited to this implementation. With speaker system 10, the rear part of the headrest is formed by second cushion portion 120 including three-dimensional mesh-like elastic part 121 and second cover portion 122. However, the present invention is not limited to this implementation.

Figure 5:
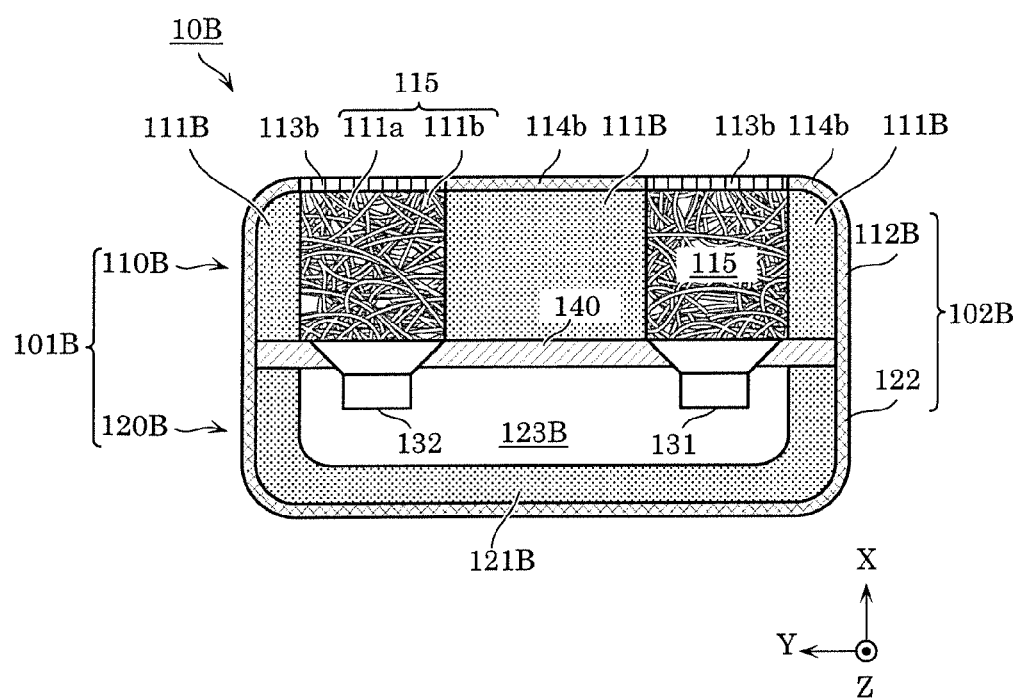
FIG. 5 is a cross-sectional view of a speaker system according to Variation 2 of Embodiment 1 that corresponds to the cross-sectional view taken along the line III-III.

FIG. 5 is a cross-sectional view of a speaker system according to Variation 2 of Embodiment 1 that corresponds to the cross-sectional view taken along the line III-III.

As shown in FIG. 5, with cushion body 101B of speaker system 10B according to Variation 2 of Embodiment 1, configurations of first cushion portion 110B and second cushion portion 120B are different from the configurations of first cushion portion 110 and second cushion portion 120 of cushion body 101 of speaker system 10 according to Embodiment 1. The remainder of the configuration of speaker system 10B is the same as that of speaker system 10 according to Embodiment 1 and therefore will not be further described.

First cushion portion 110B includes first three-dimensional mesh-like elastic part 115, cushion member 111B, and first cover portion 112B. First three-dimensional mesh-like elastic part 115 is arranged in a space toward the front of speakers 131 and 132. First three-dimensional mesh-like elastic part 115 is made of the same material as first three-dimensional mesh-like elastic part 111. That is, first three-dimensional mesh-like elastic part 115 includes elastic body portion 111a and air portion 111b. Cushion member 111B is arranged in the space around first three-dimensional mesh-like elastic part 115 except in front of speakers 131 and 132. First cover portion 112B includes first cover member 113b that is arranged toward the front of first three-dimensional mesh-like elastic part 115 and second cover member 114b that is the remainder of first cover portion 112B excluding first cover member 113b. Note that first cover portion 112B is a part of the front part of cover member 102B. First cover member 113b and second cover member 114b are made of the same materials as those of first cover member 113 and second cover member 114, respectively.

In this case, the space occupied by first three-dimensional mesh-like elastic part 115 is the same as the space defined by the members other than first three-dimensional mesh-like elastic part 115 that surround first three-dimensional mesh-like elastic part 115.

Second cushion portion 120B includes cushion member 121B and second cover portion 122. Cushion member 121B is a member that covers the negative side (rear side) in the X-axis direction of speakers 131 and 132 with space 123B interposed between cushion member 121B and speakers 131 and 132. Cushion member 121B may be supported by a frame (not shown) that forms a contour of space 123B so that space 123B is formed.

Cushion members 111B and 121B are made of a foamed material, such as urethane or sponge. Second cover portion 122 is the same as that in Embodiment 1 and therefore will not be further described in detail.

Second cushion portion 120B forms space 123B in cooperation with baffle plate 140 and serves as an enclosure as with second cushion portion 120 in Embodiment 1 described above.

1-3-3. Variation 3

With speaker system 10 according to Embodiment 1, second cover member 114 is made of a sound absorbing material having airtightness. However, second cover member 114 may be made of two layers of materials including the sound absorbing material and a cover material having airtightness that covers the exterior of the sound absorbing material. The two layers of materials may be fixed to each other with an adhesive or the like or may not be fixed to each other.

1-3-4. Variation 4

With speaker system 10 according to Embodiment 1, the fibers forming three-dimensional mesh-like elastic parts 111 and 121 may have a solid structure or a hollow structure.

When the fibers forming three-dimensional mesh-like elastic parts 111 and 121, that is, elastic body portions 111a and 121a, have a solid structure, cushion body 101 can have a lower elasticity and be softer than fibers having a hollow structure having the same weight.

When the fibers forming three-dimensional mesh-like elastic parts 111 and 121, that is, elastic body portions 111a and 121a, have a hollow structure, cushion body 101 can have a higher elasticity and be stiffer than fibers having a solid structure having the same weight.

This is because a fiber having a hollow structure has a larger diameter than a fiber having a solid structure of the same weight. As the fiber diameter increases, the flexural rigidity, which is proportional to the square of the fiber diameter, that is, the fiber thickness, tends to increase. For this reason, cushion body 101 formed by fibers having a hollow structure, which have a larger diameter, is stiffer than cushion body 101 formed by fibers having a solid structure.

The elastic force of cushion body 101 can be adjusted by taking advantage of the difference in properties between the fibers having a hollow structure and the fibers having a solid structure. For example, the elastic force of cushion body 101 can be adjusted by changing the fibers forming three-dimensional mesh-like elastic parts 111 and 121 of cushion body 101 between those of the hollow structure and those of the solid structure or mixing fibers of the hollow structure and fibers of the solid structure.

Whether of the solid structure or the hollow structure, three-dimensional mesh-like elastic parts 111 and 121 have substantially the same acoustic transmissivity. The acoustic transmissivity does not substantially vary depending on whether there is no object in front of the speakers or the three-dimensional mesh-like elastic parts are arranged in front of the speakers.

Embodiment 2

A configuration of a speaker system according to Embodiment 2 will be described.

2-1. Configuration

Figure 6:
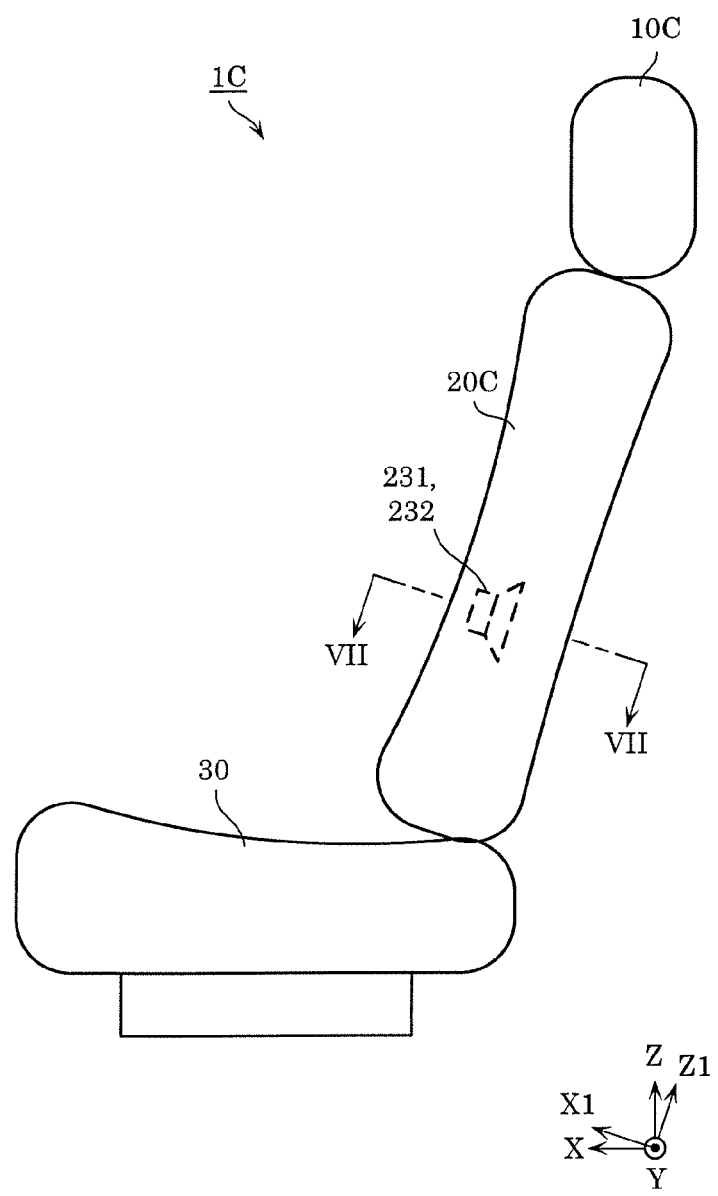
FIG. 6 is a diagram showing a seat with a speaker system according to Embodiment 2 viewed in the left-right direction.
Figure 7:
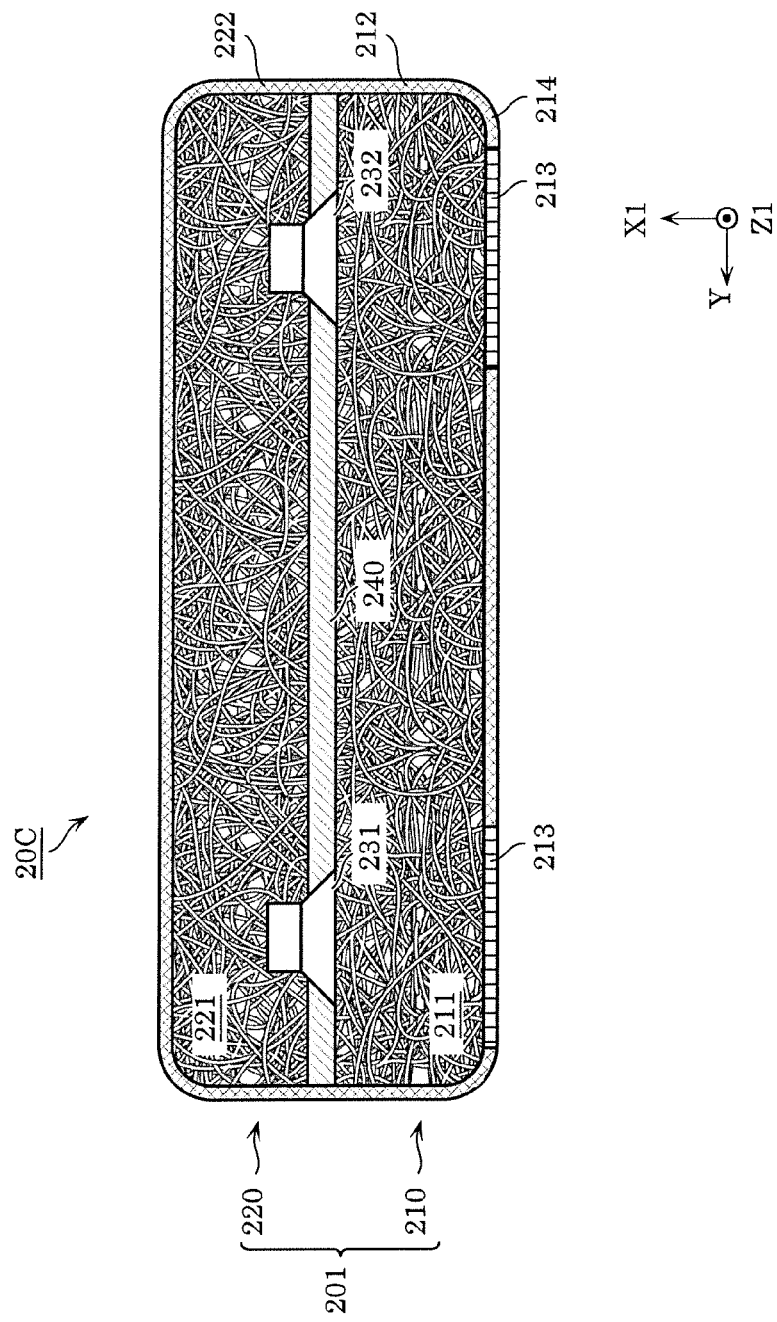
FIG. 7 is a cross-sectional view of the speaker system taken along the line VII-VII in FIG. 6.

FIG. 6 is a diagram showing a seat with a speaker system according to Embodiment 2 viewed in the left-right direction. FIG. 7 is a cross-sectional view of the speaker system taken along the line VII-VII in FIG. 6.

As shown in FIGS. 6 and 7, seat 1C according to Embodiment 2 includes headrest 10C without a speaker, speaker system 20C forming a backrest, and seat face 30.

In the following description, it is supposed that the length direction of speaker system 20C forming the backrest of seat 1C is a Z1-axis direction, and the direction perpendicular to the Z1-axis direction and the Y-axis direction is an X1-axis direction.

Speaker system 20C includes cushion body 201 and two speakers 231 and 232. Speaker system 20C may further include baffle plate 240.

Cushion body 201, two speakers 231 and 232, and baffle plate 240 correspond to cushion body 101, two speakers 131 and 132, and baffle plate 140 of speaker system 10 according to Embodiment 1, respectively. That is, speaker system 20C according to Embodiment 2 has basically the same configuration as speaker system 10 according to Embodiment 1 and differs from speaker system 10 according to Embodiment 1 in that speaker system 10C is shaped and sized to fit to the backrest and is configured to emit a sound to the negative side in the X1-axis direction of seat 1C.

Cushion body 201 includes first cushion portion 210 and second cushion portion 220 that are arranged toward the front and rear of the backrest, respectively. First cushion portion 210 is a portion of cushion body 201 that forms a part of the backrest toward the negative side in the X1-axis direction. That is, first cushion portion 210 is arranged on the negative side in the X1-axis direction of baffle plate 240. Second cushion portion 220 is a portion of cushion body 201 that forms a part of the backrest toward the positive side in the X1-axis direction. That is, second cushion portion 220 is arranged on the positive side in the X1-axis direction of baffle plate 240.

First three-dimensional mesh-like elastic part 211 and first cover portion 212 of first cushion portion 210 have the same configurations as those of first three-dimensional mesh-like elastic part 111 and first cover portion 112 according to Embodiment 1, respectively. Second three-dimensional mesh-like elastic part 221 and second cover portion 222 of second cushion portion 220 have the same configurations as those of second three-dimensional mesh-like elastic part 121 and second cover portion 122 according to Embodiment 1, respectively. First cover member 213 and second cover member 214 have the same configurations as those of first cover member 113 and second cover member 114 according to Embodiment 1, respectively.

Speakers 231 and 232 are arranged in such an orientation that speakers 231 and 232 emit a sound toward the negative side in the X1-axis direction of the backrest.

2-2. Effects and the Like

With speaker system 20C according to this embodiment, the uncomfortable feeling experienced by the person coming into contact with the backrest can be reduced, and a sound can be effectively and efficiently emitted toward the rear of the backrest or headrest.

Speakers 231 and 232 are covered with second three-dimensional mesh-like elastic part 221 at the rear thereof, and second three-dimensional mesh-like elastic part 221 is covered by baffle plate 240 and second cover portion 222. Second cover portion 222 is formed by second cover member 214. Therefore, a closed space defined by baffle plate 240 and second cover member 214 is formed at the rear of speakers 231 and 232, and the closed space can serve as an enclosure. Since the space in second cushion portion 220 serving as a cushion member can also serve as an enclosure, the volume of the space in the backrest can be efficiently used. Therefore, the stiffness of a gas in the closed space in second cushion portion 220 can be reduced. Therefore, canceling of low-frequency sounds can be reduced, and a sound having excellent sound pressure frequency characteristics can be emitted rearward.

2-3. Variations of Embodiment 2

2-3-1. Variation 1

Although speaker system 20C according to Embodiment 2 has been described as forming a backrest, speaker system 20C may form a headrest. That is, speaker system 20C may be a speaker system arranged in a headrest that is configured to emit sound from the speakers rearward.

2-3-2. Variation 2

In addition, speaker system 20C according to Embodiment 2 has been described as being configured so that speakers 231 and 232 are housed in cushion body 201. However, the present invention is not limited to this implementation, and front faces of speakers 231 and 232 may be exposed to the space at the rear of the backrest. In that case, a protection net may be attached to the front faces of speakers 231 and 232.

Embodiment 3

A configuration of a speaker system according to Embodiment 3 will be described.

3-1. Configuration

Figure 8:
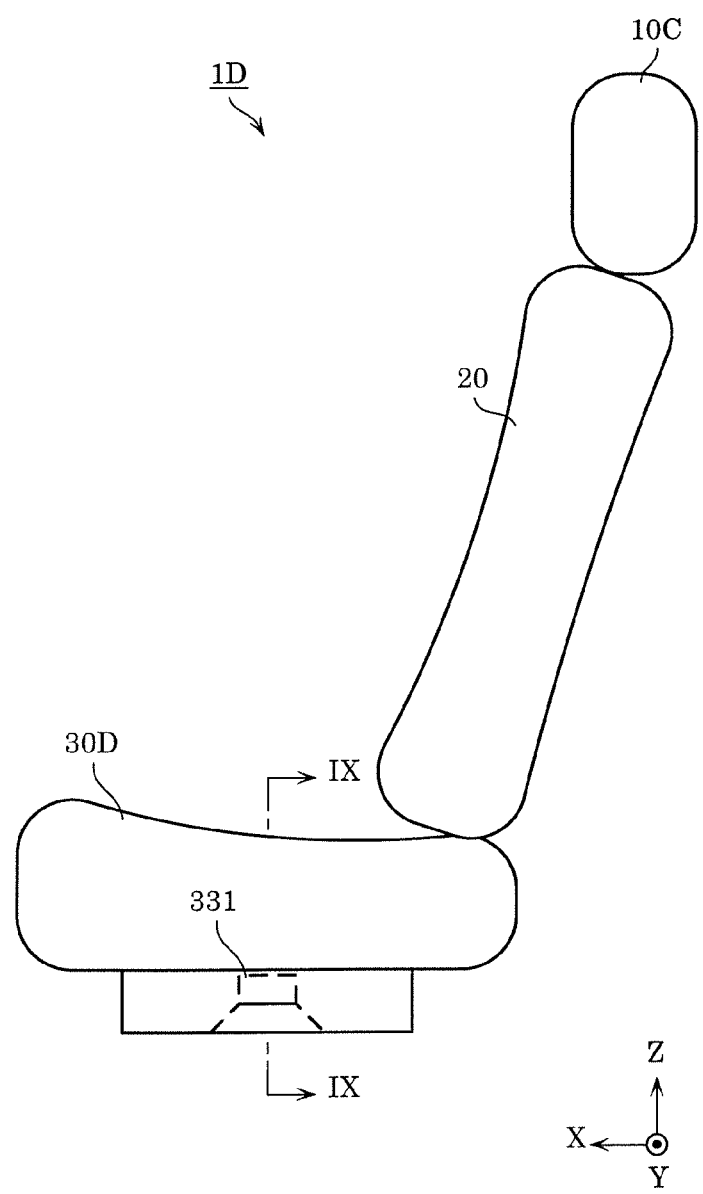
FIG. 8 is a diagram showing a seat with a speaker system according to Embodiment 3 viewed in the left-right direction.
Figure 9:
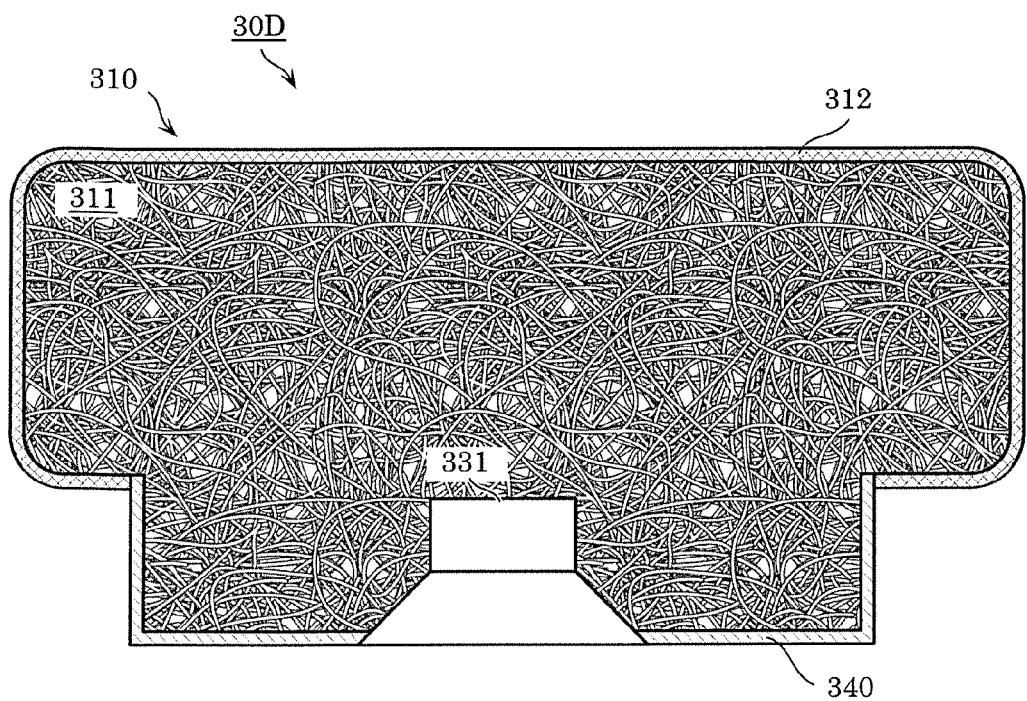
FIG. 9 is a cross-sectional view of the speaker system taken along the line IX-IX in FIG. 8.

FIG. 8 is a diagram showing a seat with a speaker system according to Embodiment 3 viewed in the left-right direction. FIG. 9 is a cross-sectional view of the speaker system taken along the line IX-IX in FIG. 8.

As shown in FIGS. 8 and 9, seat 1D according to Embodiment 3 includes headrest 10C without a speaker, backrest 20 without a speaker, and speaker system 30D forming a seat face.

Speaker system 30D includes cushion body 310, speaker 331, and baffle plate 340.

Cushion body 310 is a member forming seat face 30 with which a person comes into contact when the person is sitting in the seat. Cushion body 310 includes three-dimensional mesh-like elastic part 311 and cover member 312.

Three-dimensional mesh-like elastic part 311 is the same as three-dimensional mesh-like elastic part 111 described with regard to Embodiment 1. Cover member 312 is the same as second cover member 114 described with regard to Embodiment 1. Cover member 312 forms a surface of seat face 30, that is, an upper surface of seat face 30.

A front part of speaker 331 is exposed to the outside space, and the remaining part of speaker 331 is embedded in cushion body 310. Speaker 331 is arranged in such an orientation that speaker 331 emits a sound downward from seat face 30. Speaker 331 is a full-range speaker or a sub-woofer, for example. A signal of a low frequency sound may be input to speaker 331. A signal that controls vibration may be input to speaker 331.

Baffle plate 340 is a member to which speaker 331 is fixed. Baffle plate 340 is a box-like member that is open at the top, and is connected to a lower part of cushion body 310 at an upper part thereof. In this way, cover member 312 of cushion body 310 and baffle plate 340 defines a space.

Baffle plate 340 has an opening having a size corresponding to the front face of speaker 331 in a bottom face thereof. Speaker 331 is fixed to baffle plate 340 in such a manner that the front face of speaker 331 is exposed through the opening. Speaker 331 is arranged in the space defined by cushion body 310 and baffle plate 340 connected to each other, and the space around speaker 331 is filled with three-dimensional mesh-like elastic part 311. Baffle plate 340 is made of wood, resin, or metal, for example.

3-2. Effects and the Like

With speaker system 30D according to this embodiment, the rear of speaker 331 is covered with three-dimensional mesh-like elastic part 311, and three-dimensional mesh-like elastic part 311 is covered by baffle plate 340 and cover member 312. Therefore, even if a person comes into contact with speaker system 30D, the person comes into contact with cushion body 310, and the uncomfortable feeling experienced by the person coming into contact with speaker system 30D can be reduced.

In addition, cover member 312 is made of a material having airtightness. Therefore, a closed space defined by baffle plate 340 and cover member 312 is formed at the rear of speaker 331, and the closed space can serve as an enclosure. Since the space in second cushion body 310 serving as a cushion member can also serve as an enclosure, the volume of the space within the seat face can be efficiently used. Therefore, the stiffness of a gas in the closed space defined by cushion body 310 and baffle plate 340 can be reduced. Therefore, canceling of low-frequency sounds can be effectively reduced, and a sound having excellent sound pressure frequency characteristics can be emitted rearward.

In addition, with speaker system 30D according to this embodiment, cushion body 310 forms a seat face of seat 1D. Speaker 331 is arranged in such an orientation that speaker 331 emits a sound downward from the seat face. Cover member 312 forms a surface of the seat face.

Therefore, the uncomfortable feeling experienced by the person coming into contact with the seat face can be reduced, and a sound can be effectively and efficiently emitted downward from the seat face. Furthermore, if speaker 331 is a sub-woofer, for example, vibration from the sub-woofer can be exerted to the person, and the person can physically feel a low-frequency sound from the sub-woofer. Therefore, speaker system 30D can reproduce a variety of rich sounds.

Embodiment 4

A configuration of a speaker system according to Embodiment 4 will be described.

Figure 10:
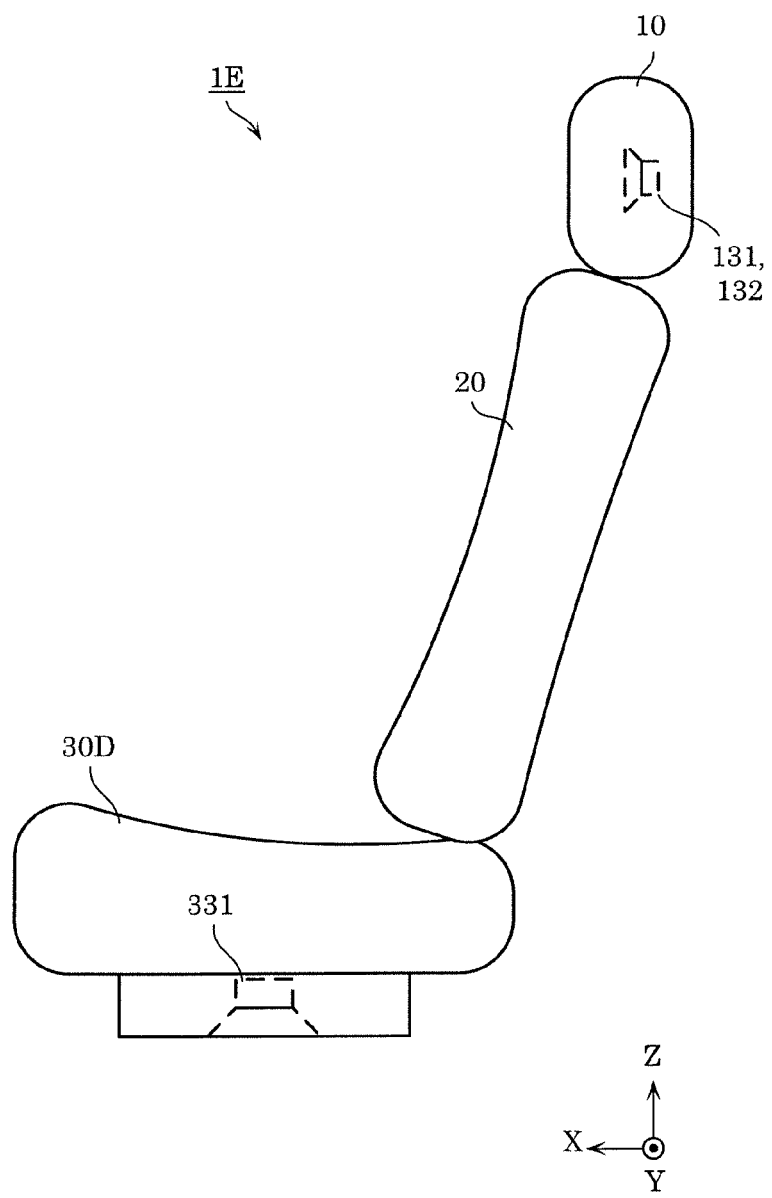
FIG. 10 is a diagram showing a seat with a speaker system according to Embodiment 4 viewed in the left-right direction.

FIG. 10 is a diagram showing a seat with a speaker system according to Embodiment 4 viewed in the left-right direction.

As shown in FIG. 10, seat 1E according to Embodiment 4 is a seat that includes speaker system 10 according to Embodiment 1 as a headrest and speaker system 30D according to Embodiment 3 as a seat face.

In this case, for example, speakers 131 and 132 of speaker system 10 of the headrest may be full-range speakers, and speaker 331 of speaker system 30D of the seat face may be a sub-woofer. With such a configuration, speaker systems 10 and 30D can reproduce a variety of rich sounds.

Embodiment 5

A configuration of a noise controlling device according to Embodiment 5 will be described.

5-1. Configuration

Figure 11:
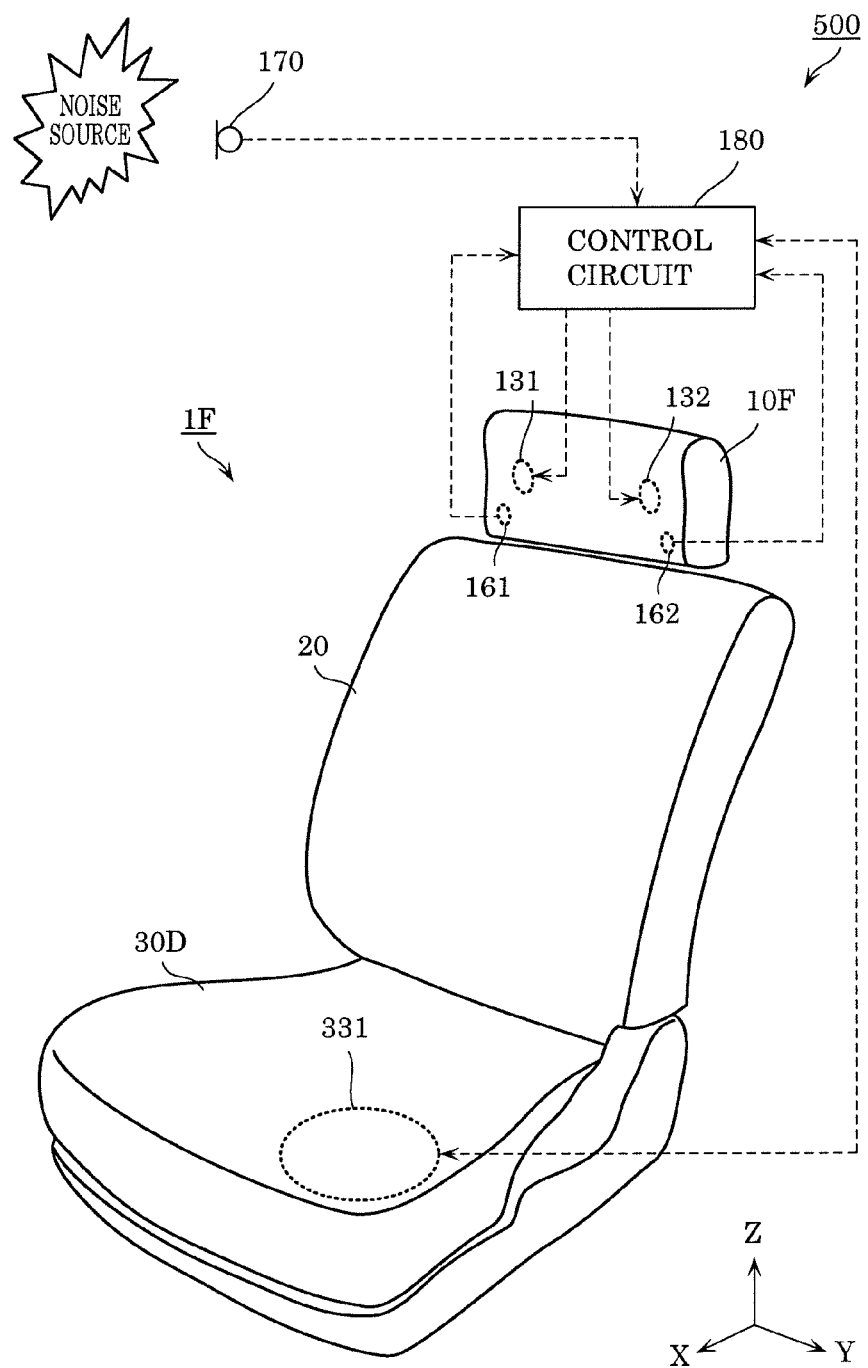
FIG. 11 is a diagram showing a configuration of a noise controlling device according to Embodiment 5.
Figure 12:
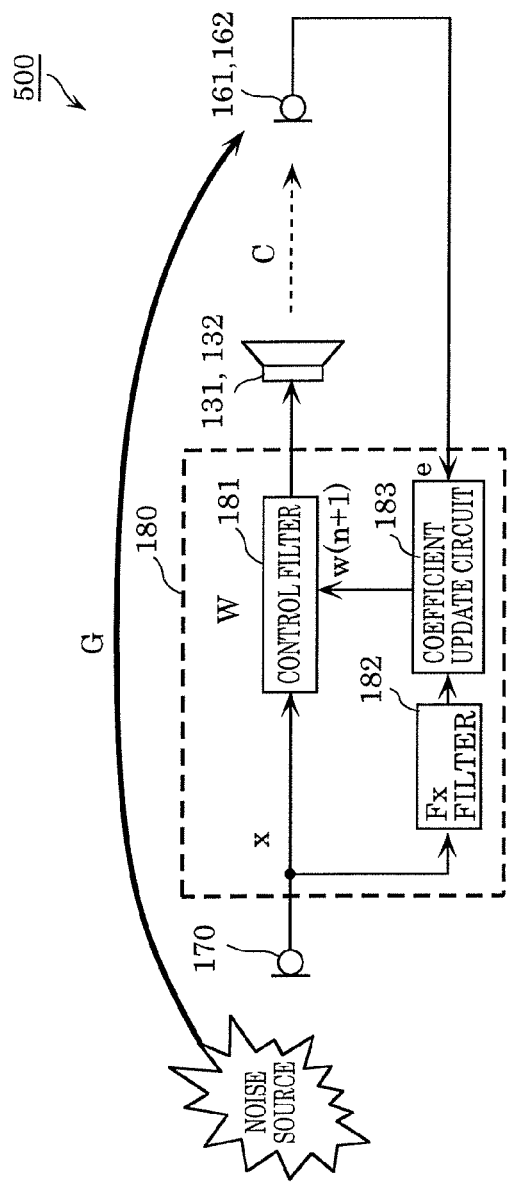
FIG. 12 is a diagram showing an example of a configuration of the noise controlling device that performs an active noise control using the Filtered-X LMS algorithm.

FIG. 11 is a diagram showing a configuration of the noise controlling device according to Embodiment 5. FIG. 12 is a diagram showing an example of a configuration of the noise controlling device that performs an active noise control using the Filtered-X LMS algorithm.

As shown in FIG. 11, noise controlling device 500 includes speaker systems 10F and 30D, noise detector 170, and control circuit 180. Seat 1F according to this embodiment includes speaker system 10F of noise controlling device 500 as a headrest and speaker system 30D of noise controlling device 500 as a seat face. Seat 1F includes backrest 20 in addition to speaker systems 10F and 30D. Seat 1F may further include control circuit 180.

Speaker system 10F includes sound collectors 161 and 162 in addition to the components of speaker system 10 according to Embodiment 1. Sound collectors 161 and 162 are arranged in cushion body 101 and collect noise. Sound collectors 161 and 162 are sound collectors that collect noise at the locations where sound collectors 161 and 162 are arranged, and are implemented by microphones, for example. A cover member opposed to sound collectors 161 and 162 in cushion body 101 of speaker system 10F is first cover member 113. Speaker system 30D has the same configuration as speaker system 30D according to Embodiment 3.

Noise detector 170 detects noise X from a noise source and outputs a noise signal indicating the detected noise. Noise detector 170 detects noise X from a predetermined noise source and outputs a noise signal indicating noise X to control circuit 180. Noise detector 170 is a microphone, for example.

Control circuit 180 obtains the noise signal output from noise detector 170 and outputs a control signal to reduce the noise in the vicinity of the position of the head of the person to speakers 131 and 132. The vicinity of the position of the head of the person is a region toward the front of the headrest, for example. Control circuit 180 further repeatedly obtains the output signal from sound collectors 161 and 162 and repeatedly generates a control signal so as to minimize the obtained output signal. That is, control circuit 180 obtains a noise signal from noise detector 170 and generates, based on the obtained noise signal, a control signal to reduce noise X at the locations where sound collectors 161 and 162 are arranged when noise X from the noise source propagates along a transmission path G to the locations where sound collectors 161 and 162 are arranged. Control circuit 180 outputs the generated control signal to speakers 131 and 132. Control circuit 180 further obtains an error signal from sound collectors 161 and 162 and generates the control signal in such a manner that the error signal is reduced. Control circuit 180 is implemented by a processor or a dedicated circuit, for example. The function of control circuit 180 for generating the control signal may be implemented by software or hardware.

In the following, a functionality of control circuit 180 will be specifically described.

Transmission characteristics from speakers 131 to 132 to sound collectors 161 and 162 are recorded as coefficient in Fx filter 182 in control circuit 180, and these coefficients are subjected to a convolution processing to the noise signal from noise detector 170 and input to coefficient update circuit 183.

Based on the input signal and the error signal (output signal) from sound collectors 161 and 162, coefficient update circuit 183 updates a control coefficient for control filter 181 so as to minimize the error signal. The least square method (LMS) is used for the coefficient update by coefficient update circuit 183, for example. Fx filter 182 then corrects the transmission characteristics from speakers 131 and 132 to sound collectors 161 and 162. That is, control circuit 180 repeatedly obtains an error signal from sound collectors 161 and 162 and repeatedly adjusts the control coefficient so that the obtained error signal is smaller than the previous obtained error signal. control circuit 180 then generates a control signal using the repeatedly adjusted control coefficient and outputs the control signal from speakers 131 and 132. In this way, control circuit 180 adjusts the control coefficient that minimizes the error signal.

As described above, when noise X from the noise source propagates to sound collectors 161 and 162 along the transmission path G, control circuit 180 detects noise X with noise detector 170 and outputs, from speakers 131 and 132, a control signal generated by processing the noise signal indicating detected noise X using control filter 181. In this process, if the condition expressed by the following formula 1 is established in sound collectors 161 and 162, the noise from the noise source can be reduced at the locations of sound collectors 161 and 162.

$$WXC+GX=0, W=-G/C \quad \text{(Formula 1)}$$

Note that formula 1 is expressed in the frequency domain. A method of specifically determining the characteristics of control filter W shown in formula 1 is the Filtered-X LMS algorithm, which involves the computation according to formula 2. Ideally, the computation is repeated to converge to the condition expressed by formula 1. Note that formula 2 is expressed in the time domain.

$$w(n+1)=w(n)+\mu r^T(n)e(n)$$

$$r(n)=c^T(n)\times(n) \quad \text{(Formula 2)}$$

$[.]^T$ denotes transposition.
μ denotes a convergence constant.

5-2. Effects and the Like

Noise controlling device 500 according to this embodiment includes speaker system 10F, noise detector 170, and control circuit 180. Noise detector 170 detects a noise from a noise source and outputs a noise signal indicating the detected noise. Control circuit 180 obtains the noise signal output from noise detector 170 and outputs a control signal to reduce the noise in the vicinity of the position of the head of the person to speakers 131 and 132.

Since noise controlling device 500 uses speaker system 10F as a headrest as described above, the uncomfortable feeling experienced by the person coming into contact with speaker system 10F can be reduced, and the noise in the vicinity of the head of the person can be effectively reduced.

Noise controlling device 500 further includes sound collectors 161 and 162. Sound collectors 161 and 162 are arranged in cushion body 101 and collect noise. Furthermore, control circuit 180 repeatedly obtains output signals from sound collectors 161 and 162. Furthermore, control circuit 180 repeatedly generates a control signal so as to minimize the obtained output signal.

Since control circuit 180 of noise controlling device 500 adjusts a control coefficient so as to reduce the error signal obtained from sound collectors 161 and 162, the noise in the vicinity of the head of the person can be effectively reduced.

In addition, speaker system 10F with speakers 131 and 132 that output the control signal of noise controlling device 500 forms a headrest, in front of which the head of the person sitting in the seat is located. Therefore, if an adjustment is made so that an optimal sound is emitted toward the front of the headrest, the noise in the vicinity of the head can be effectively reduced, regardless of the position of seat 1. Therefore, even if seat 1 is moved, such as when seat 1 is rotated in the cabin of an automobile, the noise in the vicinity of the head of the person can be easily reduced.

5-3. Variations of Embodiment 5

With noise controlling device 500 according to Embodiment 5, noise detector 170 is arranged in the vicinity of the noise source, that is, outside seat 1F. However, noise detector 170 may be arranged in seat 1F. In that case, the three-dimensional mesh-like elastic part and the first cover member having air permeability are arranged on the outer side of noise detector 170. Furthermore, when noise detector 170 is arranged in seat 1F, sound collectors 161 and 162 may not be arranged. that is, the feedback based on the error signal may not be performed.

Other Embodiments

In Embodiments 1 to 4 described above, the speakers are full-range speakers or sub-woofers, for example. However, any speaker can be used. That is, the types of the speakers in Embodiments 1 to 4 are just examples, and the speakers are not limited to any particular types of speakers.

In Embodiments 1 to 5 described above, speaker systems 10, 10A, 10B, 10F, 20C, and 30D are arranged in seats 1, 1C to 1F. However, the present invention is not limited to this implementation. For example, speaker system 10, 10A, 10B, 10F, 20C, or 30D may be used with a bed, which has a cushion body with which a person comes into contact by lying thereon.

In each embodiment described above, each component of the noise controlling device may be implemented by dedicated hardware or by executing a software program for the component. Each component may be implemented by a program executer, such as a CPU or a processor, reading a software program recorded in a recording medium, such as a hard disk or a semiconductor memory, and executing the software program.

Although speaker systems and a noise controlling device according to one or more aspects of the present disclosure have been described based on exemplary embodiments, the present disclosure is not limited to these embodiments. One or more aspects of the present disclosure may include various variations of the embodiments that occur to those skilled in the art or various combinations of components in different embodiments without departing from the spirit of the present disclosure.

Further Information About Technical Background to this Application

The disclosures of the following Japanese Patent Applications including specification, drawings and claims are incorporated herein by reference in their entirety: Japanese Patent Application No. 2018-104257 filed on May 31, 2018 and PCT International Application No. PCT/JP2019/018254 filed on May 7, 2019.

INDUSTRIAL APPLICABILITY

The present disclosure is useful as a speaker system, a noise controlling device, and the like, that can reduce the uncomfortable feeling experienced by a person coming into contact therewith and effectively emit a sound to the outside.

What is claimed is:

1. A speaker system, comprising:
a cushion body with which a person comes into contact when the person is sitting in or lying on the cushion body;
a speaker, a front of which is covered by the cushion body; and
a baffle plate to which the speaker is fixed,
wherein the cushion body includes:
a three-dimensional mesh-like elastic part that bears a load of the person, the three-dimensional mesh-like elastic part being formed by a fiber three-dimensionally entangled; and
a cover member that covers an exterior of the three-dimensional mesh-like elastic part, wherein:
the fiber of the three-dimensional mesh-like elastic part comprises a polyester-based or polyethylene-based material,
the cover member includes a first cover member that covers a part of the exterior of the three-dimensional mesh-like elastic part located at the front of the speaker and a second cover member that is a remainder of the cover member excluding the first cover member,
a perimeter of the baffle plate is affixed to the second cover member,
the second cover member forms an airtight seal,
an enclosed space covered by the baffle plate and the second cover member serves as an enclosure, and
the first cover member has a higher acoustic transmissivity than the second cover member.

2. The speaker system according to claim 1,
wherein the three-dimensional mesh-like elastic part is formed by an elastic body portion and an air portion, and
a volume of the air portion is 90% or more of a volume of the entire three-dimensional mesh-like elastic part.

3. The speaker system according to claim 1, wherein an acoustic transmissivity of the three-dimensional mesh-like elastic part is 98% or higher.

4. The speaker system according to claim 1, wherein the fiber of the three-dimensional mesh-like elastic part has a surface without irregularities.

5. The speaker system according to claim 1, wherein a sound absorbing material is arranged between the second cover member and the speaker.

6. The speaker system according to claim 1,
wherein the speaker system forms a headrest of a seat,
the cushion body includes a first cushion portion that forms a front part of the headrest, and
the speaker is oriented to emit sound toward a front of the headrest.

7. The speaker system according to claim 6,
wherein the cushion body further includes a second cushion portion that forms a rear part of the headrest,
the first cushion portion includes:
a first three-dimensional mesh-like elastic part that is a part of the three-dimensional mesh-like elastic part and covers the front of the speaker; and
a first cover portion that is a part of the cover member and covers the first three-dimensional mesh-like elastic part, and
the second cushion portion includes:
a second three-dimensional mesh-like elastic part that is a part of the three-dimensional mesh-like elastic part and covers a rear of the speaker; and
a second cover portion that is a part of the cover member and, together with the baffle part, covers the second three-dimensional mesh-like elastic part.

8. The speaker system according to claim 6,
wherein the cushion body further includes a second cushion portion that forms a rear part of the headrest,
the first cushion portion includes:
a first three-dimensional mesh-like elastic part that is a part of the three-dimensional mesh-like elastic part and covers the front of the speaker; and
a first cover portion that is a part of the cover member and covers the first three-dimensional mesh-like elastic part, and
the second cushion portion includes:
a cushion member that covers the rear of the speaker with a space interposed between the cushion member and the speaker; and
a second cover portion that is a part of the cover member and covers the cushion member.

9. The speaker system according to claim 1,
wherein the speaker system forms a headrest or a backrest of a seat,
the cushion body includes a first cushion portion that forms a rear part of the headrest or the backrest, and
the speaker is oriented to emit sound rearward from the backrest or the headrest.

10. The speaker system according to claim 9,
wherein the cushion body further includes a second cushion portion that forms a front part of the headrest or the backrest,
the first cushion portion includes:
a first three-dimensional mesh-like elastic part that is a part of the three-dimensional mesh-like elastic part and covers the front of the speaker; and
a first cover portion that is a part of the cover member and covers the first three-dimensional mesh-like elastic part, and
the second cushion portion includes:
a second three-dimensional mesh-like elastic part that is a part of the three-dimensional mesh-like elastic part and covers the rear of the speaker; and
a second cover portion that is a part of the cover member and, together with the baffle plate, covers the second three-dimensional mesh-like elastic part.

11. A noise controlling device, comprising:
the speaker system according to claim 1; and
a control circuit that outputs a control signal for reducing a noise in a vicinity of a position of a head of the person to the speaker.

12. The noise controlling device according to claim 11, further comprising:
a sound collector that collects a noise, the sound collector being arranged in the cushion body,
wherein the control circuit:
repeatedly obtains an output signal of the sound collector; and
repeatedly generates the control signal so as to minimize the obtained output signal.

13. The speaker system according to claim 1,
wherein the perimeter of the baffle plate is directly affixed to the second cover member, and
wherein the second cover member forms an airtight seal with the baffle plate.

14. A speaker system, comprising:
a cushion body with which a person comes into contact when the person is sitting in or lying on the cushion body;

a speaker that has a front part exposed to an outside space and a remaining part excluding the front part embedded in the cushion body; and a baffle plate to which the speaker is fixed, wherein the cushion body includes:

a three-dimensional mesh-like elastic part that bears a load of the person, the three-dimensional mesh-like elastic part being formed by a fiber three-dimensionally entangled; and a cover member that has airtightness and, together with the baffle plate, covers a surrounding of the three-dimensional mesh-like elastic part, wherein a perimeter of the baffle plate is affixed to the cover member, wherein an enclosed space covered by the baffle plate and the cover member serves as an enclosure, and wherein the fiber of the three-dimensional mesh-like elastic part comprises a polyester-based or polyethylene-based material.

15. The speaker system according to claim 14, wherein the three-dimensional mesh-like elastic part is formed by an elastic body portion and an air portion, and a volume of the air portion is 90% or more of a volume of the entire three-dimensional mesh-like elastic part.

16. The speaker system according to claim 14, wherein the cushion body forms a seat face of a seat, the speaker is oriented to emit sound downward from the seat face, and the cover member forms a surface of the seat face.

17. The speaker system according to claim 16, wherein a signal of a low-frequency sound is input to the speaker.

18. The speaker system according to claim 16, wherein a signal that controls vibration is input to the speaker.

19. The speaker system according to claim 14, wherein the perimeter of the baffle plate is directly affixed to the cover member.

* * * * *